(12) United States Patent
Rabinovich et al.

(10) Patent No.: US 8,049,507 B2
(45) Date of Patent: Nov. 1, 2011

(54) TRANSIENT EM FOR GEOSTEERING AND LWD/WIRELINE FORMATION EVALUATION

(75) Inventors: Michael B. Rabinovich, Houston, TX (US); Alexandre N. Bespalov, Spring, TX (US); Stanislav W. Forgang, Houston, TX (US); Daniel T. Georgi, Houston, TX (US); Gregory B. Itskovich, Houston, TX (US); Leonty A. Tabarovsky, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 513 days.

(21) Appl. No.: 12/263,817

(22) Filed: Nov. 3, 2008

(65) Prior Publication Data

US 2010/0109672 A1    May 6, 2010

(51) Int. Cl.
*G01V 3/08* (2006.01)
(52) U.S. Cl. .......................................... 324/338
(58) Field of Classification Search .............. 324/338, 324/339, 332–334, 354, 357; 702/1–16; 175/24–40; 703/5, 10
See application file for complete search history.

(56) References Cited

U.S. PATENT DOCUMENTS

| | | | |
|---|---|---|---|
| 5,452,761 A | 9/1995 | Beard et al. | |
| 6,574,562 B2 | 6/2003 | Tabarovsky et al. | |
| 7,027,922 B2 * | 4/2006 | Bespalov et al. | 702/7 |
| 7,031,839 B2 | 4/2006 | Tabarovsky et al. | |
| 7,150,316 B2 * | 12/2006 | Itskovich | 166/248 |
| 7,269,515 B2 | 9/2007 | Tabarovsky et al. | |
| 7,359,800 B2 | 4/2008 | Rabinovich et al. | |
| 7,392,137 B2 | 6/2008 | Tabarovsky et al. | |
| 2008/0030196 A1 | 2/2008 | Bespalov et al. | |
| 2008/0215243 A1 | 9/2008 | Rabinovich et al. | |

OTHER PUBLICATIONS

M. Rabinovich et al.; "Effect of Fractures on Multi-component and Multi-array Induction Logs", SPWLA 45th Annual Logging Symposium, Paper UU, Jun. 6-9, 2004, pp. 1-16.

M. Rabinovich et al.; "Processing Multi-component Induction Data for Formation Dip and Anisotropy," Petrophysics, vol. 47, No. 6, Dec. 2006, pp. 506-526.

* cited by examiner

*Primary Examiner* — Jermele M Hollington
*Assistant Examiner* — Tung X Nguyen
(74) *Attorney, Agent, or Firm* — Mossman, Kumar & Tyler, P.C.

(57) ABSTRACT

A transmitter on an instrument is used to induce currents in an earth formation when it is turned on or off. A Fourier transform is applied to transient measurements made in the receivers. A multifrequency focusing of the transformed data is used for applications like determination of a distance to an interface in the formation, controlling the drilling direction, determination of formation resistivities and formation strike directions.

17 Claims, 4 Drawing Sheets

TRANSIENT EM FOR GEOSTEERING AND LWD/WIRELINE FORMATION EVALUATION

BACKGROUND OF THE DISCLOSURE

1. Field of the Disclosure

The disclosure is related to the field of electromagnetic induction well logging for estimating a property of earth formations penetrated by a wellbore.

2. Description of the Related Art

Electromagnetic induction resistivity instruments can be used to determine the electrical conductivity of earth formations surrounding a wellbore. An electromagnetic induction well logging instrument is described, for example, in U.S. Pat. No. 5,452,761 ("the '671 patent") issued to Beard et al. The instrument described in the Beard '761 patent includes a transmitter coil and a plurality of receiver coils positioned at axially spaced apart locations along an instrument housing. An alternating current is passed through the transmitter coil. Voltages which are induced in the receiver coils as a result of alternating magnetic fields induced in the earth formations are then measured. The magnitude of certain phase components of the induced receiver voltages are related to the conductivity of the media surrounding the instrument.

Resistivity tools, referred to as deep-looking electromagnetic tools, are used to determine properties of earth formation at distances from tens to hundreds of meters (ultra-deep scale) from the borehole. Such tools are typically limited to high resistivity formations and are further constrained by the power available downhole.

Induction measurements in frequency domain are widely used in LWD/wireline formation evaluation (FE) and geosteering. Acquiring measurements at more than one frequency allows one to apply a multi-frequency focusing technique (MFF) which efficiently eliminates near-borehole effects, increases depth of investigation, and simplifies the dependence of tool responses to formation parameters. The latter is especially important in interpreting multi-component data in deviated wells where the complexity of the tool responses often precludes from obtaining fast and accurate results. The MFF applications with conventional and multi-component measurements are described in numerous patents, papers, and reports and include but are not limited to:

Determining formation resistivities and resistivity anisotropy in isotropic, transverse isotropic (TI) and bi-axially anisotropic models;

Determining formation dips and azimuths in anisotropic formations;

Using the MFF technique in LWD FE applications and geosteering in the presence of a drill pipe;

MFF deep geosteering based on distance to bed processing and/or processing for formation dip and azimuth;

Processing and corrections for fracture.

See, for example U.S. Pat. No. 7,027,922 to Bespalov et al., U.S. Pat. No. 7,031,839 to Tabarovsky et al., U.S. Pat. No. 6,574,562 to Tabarovsky et al., and U.S. Pat. No. 7,392,137 to Tabarovsky et al., all having the same assignee as the present document and the contents of which are incorporated herein by reference.

At the ultra-deep scale, a technology may be employed based on transient field behavior. The transient electromagnetic field method is widely used in surface geophysics. Examples of transient technology are seen, for example, in Kaufman et al., 1983, "Frequency and transient soundings", Elsevier Science.; Sidorov et al., 1969, "Geophysical surveys with near zone transient EM." Published by NVIGG, Saratov, Russia.; and U.S. Pat. No. 7,027,922 to Bespalov et al., having the same assignee as the present disclosure and the contents of which are incorporated herein by reference. Bespalov teaches the use of differential or integral filtering of the latter part of a transient signal to estimate formation properties in the presence of a mandrel with finite conductivity.

Multi-frequency focusing (MFF) is an efficient way of increasing depth of investigation for electromagnetic logging tools. It is being successfully used in wireline applications, for example, in processing and interpretation of multi-component measurement devices. An example of such a device is the 3DExplorer® (3DEX®) induction logging instrument of Baker Hughes. In the 3DEX® instrument, three transmitters are placed axially on a tool mandrel and induce magnetic fields in three mutually orthogonal spatial directions: x, y, and z. The z-axis is chosen to be along the longitudinal axis of the tool, and the x-axis and y-axis are mutually perpendicular lying in the plane transverse to the z-axis. Three receivers, $R_x$, $R_z$, and $R_y$, are aligned along the orthogonal system defined by the transmitters. Measurements can be made for the corresponding magnetic fields $H_{xx}$, $H_{zz}$, and $H_{yy}$, as well as cross-components, $H_{xy}$ and $H_{xz}$. The 3DEX® is operable in single frequency and multiple frequency modes.

MFF is based on specific assumptions regarding the frequency-dependence of electromagnetic field in the frequency domain. For MWD tools mounted on metal mandrels, those assumptions are not valid. Particularly, the composition of a mathematical series describing an EM field at low frequencies changes when a highly conductive body is placed in the vicinity of sensors. Only if the mandrel material were perfectly conducting, would MFF be applicable.

One of the drawbacks of multifrequency acquisition is the time needed to acquire signals at a plurality of frequencies can be large. In addition, maintaining the transmitter circuits in tune for the plurality of frequencies may become a problem. In contrast, TEM methods require a shorter acquisition time and a single circuit. However, such methods typically use more complicated A/D conversion to handle small sampling intervals needed for TEM measurements. The present disclosure provides an improved method of processing TEM signals.

SUMMARY OF THE DISCLOSURE

One embodiment of the disclosure is a method of evaluating an earth formation. The method includes conveying a logging tool into a borehole, changing a current through a transmitter on the logging tool and inducing a current in the formation, receiving a transient signal resulting from the induced current in the formation; transforming the transient signal to a frequency domain, and estimating from the transformed signal a distance to an interface in the earth formation.

Another embodiment of the disclosure is an apparatus for evaluating an earth formation. The apparatus includes a logging tool configured to be conveyed into a borehole, and at least one processor configured to change a current through a transmitter on the logging tool and induce a current in said earth formation; transform, into a frequency domain, a transient signal received by a receiver on the logging tool resulting from the induced current; and estimate from the transformed signal a distance to an interface in the earth formation.

Another embodiment of the disclosure is a computer-readable medium accessible to at least one processor, the computer-readable medium including instructions which enable the at least one processor to transform, into a frequency domain, a transient signal received by a receiver on a logging tool in an earth formation resulting from an induced current produced by changing a current in a transmitter on the logging tool, and estimate from the transformed signal a distance to an interface in the earth formation.

BRIEF DESCRIPTION OF THE DRAWINGS

The present disclosure is best understood with reference to the accompanying drawings in which like numerals refer to like elements and in which.

DESCRIPTION OF AN EMBODIMENT

Figure 1:
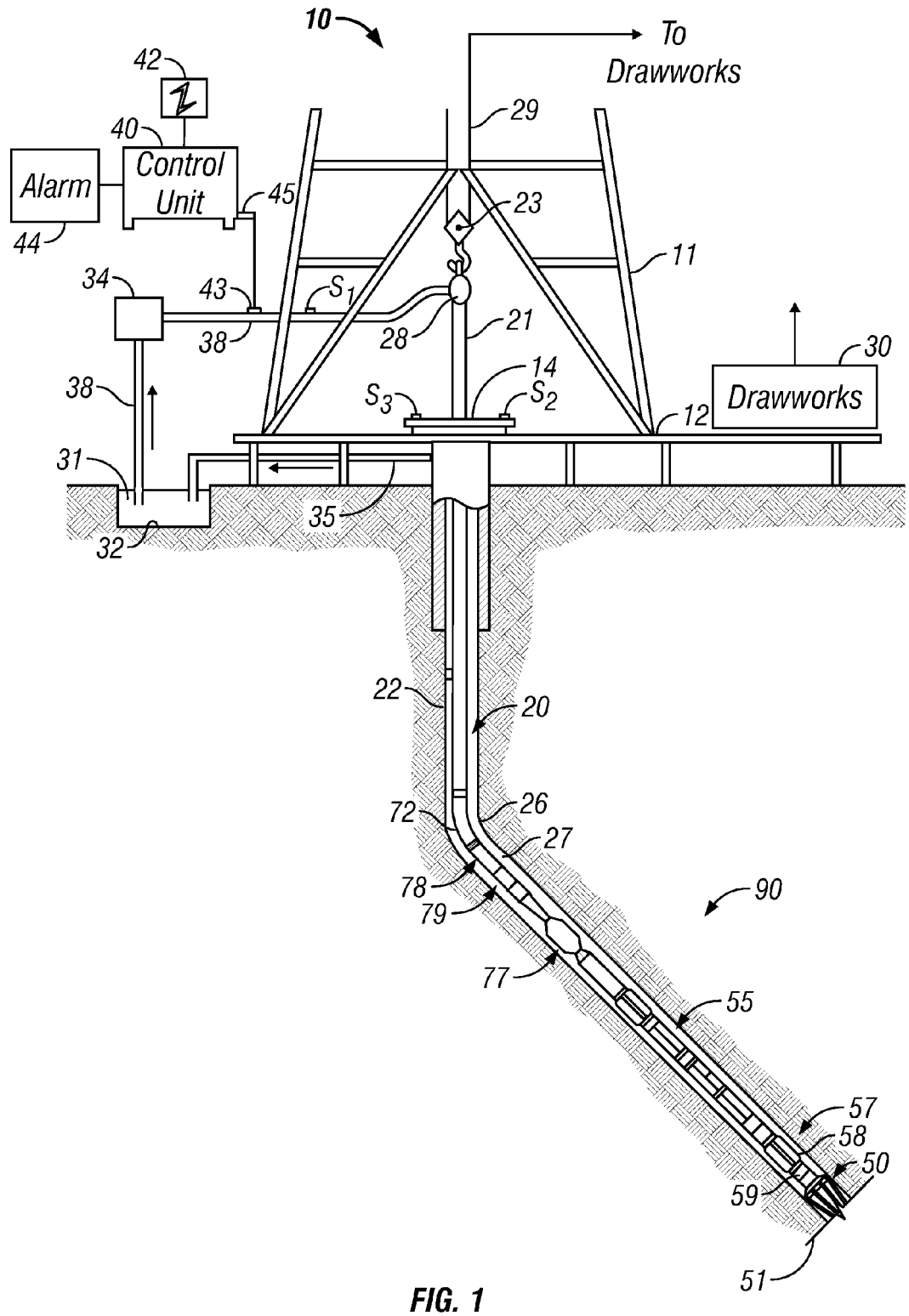
FIG. 1 shows an induction logging instrument as it is typically used to make measurements suitable for use with the method of the disclosure.

FIG. 1 shows a schematic diagram of a drilling system 10 with a drillstring 20 carrying a drilling assembly 90 (also referred to as the bottom hole assembly, or "BHA") conveyed in a "wellbore" (or "borehole") 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 extending downward from the surface into the borehole 26. The drillstring 20 is pushed into the wellbore 26 when a drill pipe 22 is used as the tubing. Alternatively, a coiled-tubing may be utilized to convey the BHA into the borehole 26. For coiled-tubing applications, a tubing injector, such as an injector (not shown), however, is used to move the coiled tubing from a source thereof, such as a reel (not shown), to the borehole 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit which affects the rate of penetration.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and carry borehole cutting or chips to the surface. A sensor $S_1$ may be placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 may be used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In the embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters may include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and a Measurement-while-drilling (MWD) tool 79 are all connected in tandem with the drillstring 20. Flex subs, for example, are used in connecting the MWD tool 79 in the drilling assembly 90. Such subs and tools form the drilling assembly 90 between the drillstring 20 and the drill bit 50. The drilling assembly 90 makes various measurements described herein while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 may include a computer or a microprocessor-based processing system, memory for storing programs or models and data, a recorder for recording data, and other peripherals. The control unit 40 may be adapted to activate alarms 44 when certain unsafe or undesirable operating conditions occur.

Figure 2A:
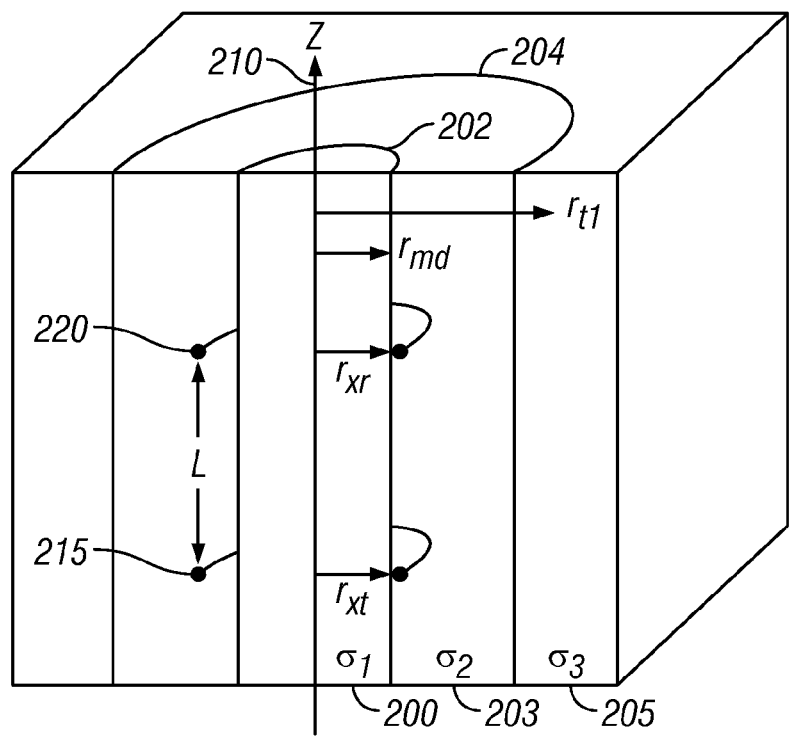
FIGS. 2(a) and 2(b) show the geometry of a borehole (a) with and (b) without an invaded zone.
Figure 2B:
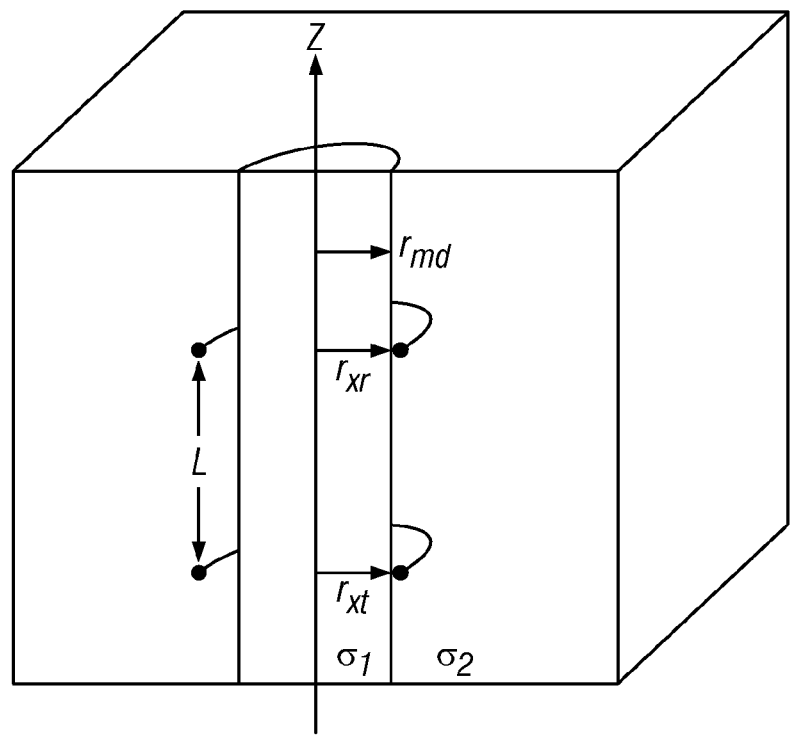
Figure 3:
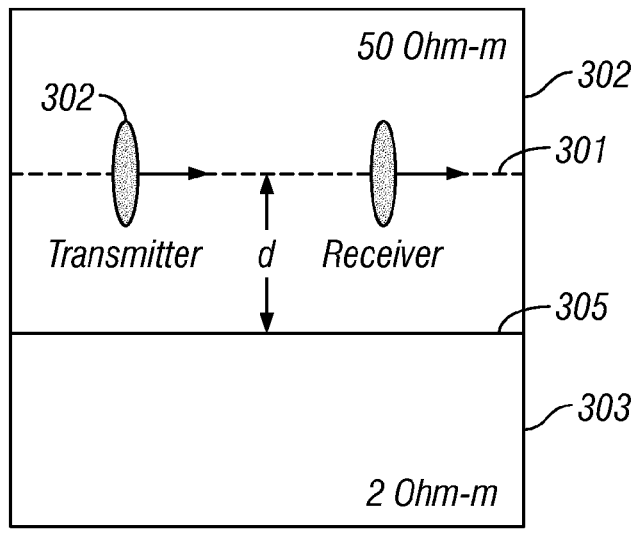
FIG. 3 shows a transmitter-receiver assembly positioned near a formation interface.

FIG. 2(a) shows the basic geometry of the tool disposed in a borehole. The borehole 200 has a fluid of conductivity $\sigma_1$. There is an invaded zone 203 having conductivity $\sigma_2$ and the space outside 205 has a conductivity $\sigma_3$. The borehole wall is denoted by 202 while the outdoor boundary of the first invaded zone is denoted by 204. The transmitter is located at 215 where the borehole diameter is $r_{xt}$ while the receiver is located at 220 where the borehole diameter is $r_{xr}$. The distance between the transmitter and the receiver is "L". The borehole axis is denoted by 210. FIG. 2(b) is similar to FIG. 2(a) except that there is no invaded zone. FIG. 3 shows a transmitter-receiver assembly lying next to a formation interface 305. Transmitter and receiver lie along a common axis 301 that is horizontally positioned in the upper half-space 302 parallel to the interface and is separated by a distance d from the interface. The term "interface" includes a fluid interface between two different fluids in an earth formation as well as a boundary between two different geologic or stratigraphic intervals in the earth. The upper half-space 302 has a resistivity of 50 Ω-m and the remote formation (lower half-space) 303 is shown to have a resistivity of 2 Ω-m.

Figure 4:
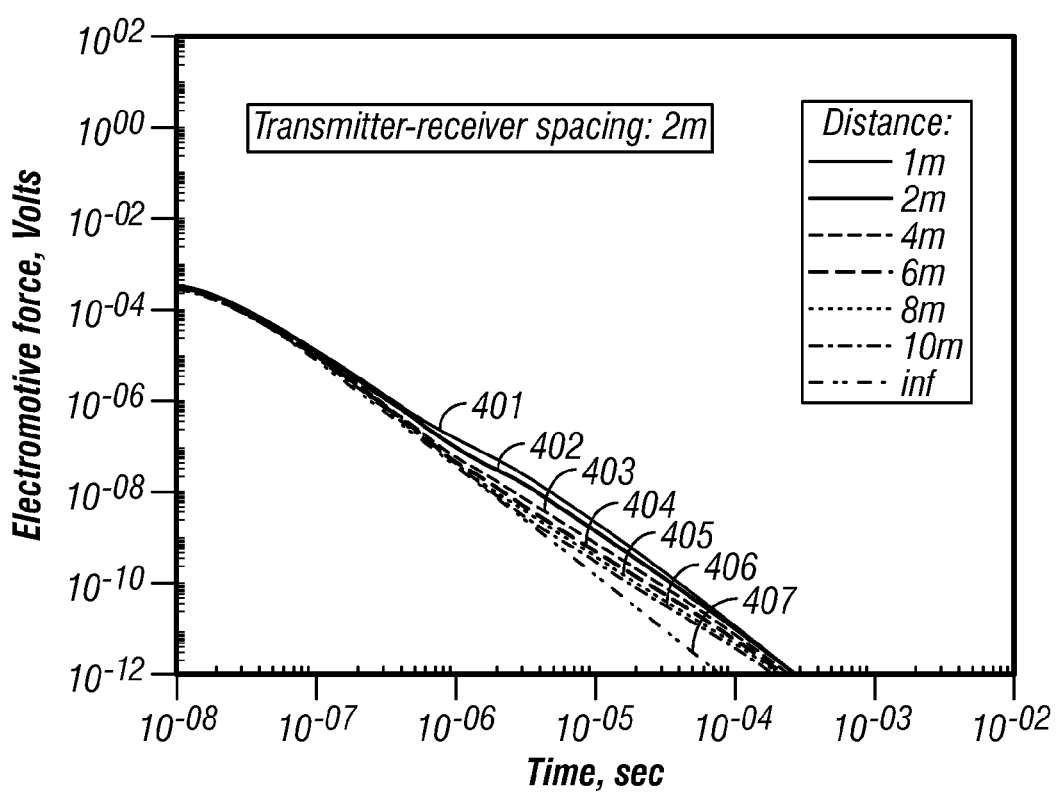
FIG. 4 shows transient responses due to a remove plane interface of the configuration of FIG. 3.

FIG. 4 shows transient responses of the transmitter-receiver assembly operated in the presence of a remote plane interface without the presence of a finite-conductivity pipe. The transient response is obtained by changing a current through a transmitter on the logging tool and inducing a current in the earth formation. A transient signal resulting from the induced current is received. Responses measured in Volts as the ordinate and the time is shown in seconds as the abscissa. The transmitter-receiver spacing is 2 m and transient responses are shown for several distances. Responses at distances of 1, 2, 4, 6, 8, and 10 meters are shown as 401, 402, 403, 404, 405, and 406, respectively. The response for infinite separation distance is shown as 407. At a very early times (t<100 nanoseconds) no sensitivity to remote interfaces is present. In the time interval 100 nsec<t<100 μsec, the responses depend significantly on the distance to the interface 305. During this time interval the currents diffuse deeper into the formation and reach the interface 305. Later t>100 μsec, the responses once again show a lack of dependence on the distance to the interface 305, because the diffusing currents have passed the interface 305 and are flowing predominantly in the conductive lower half-space 303. It should be noted that the coaxial transmitter-receiver configuration shown herein is not to be construed as a limitation and any suitable arrangement including but not limited to an arrangement having a transverse transmitter and/or a transverse receiver may be used.

In one embodiment of the disclosure, with a transient signal resulting from an induced current in the formation is measured using the wireline or MWD/LWD tool, and by applying the Fourier transform, the responses in the frequency domain are calculated. MFF is then applied to the signals in the frequency domain. The following are specific examples of different applications of MFF to the Fourier-transformed transient signals.

Many prior art TEM methods were developed for wireline applications in which the logging tool has a perfectly conducting mandrel. For MWD applications, the BHA has a finite conductivity, so that prior art methods developed for a perfectly conducting mandrel may give erroneous results. The present method applies the Fourier transform and then uses an MFF that accounts for the finite conductivity of the BHA.

The method of the present disclosure is also amenable for use in anisotropic media using the 3DEX® tool. U.S. Pat. No. 6,574,562 to Tabarovsky, having the same assignee as the present disclosure and the contents of which are incorporated herein by reference. Disclosed in Tabarovsky '562 is a method of determination of horizontal and vertical conductivities of subsurface formations using a combination of data acquired with a transverse induction logging tool such as the 3DEX® tool and data acquired with a conventional high definition induction logging tool (HDIL). 3DEX® data are acquired at a plurality of frequencies and a multifrequency skin-effect correction is applied to the 3DEX® data. An isotropic resistivity model is derived from HDIL data (multiple frequencies and multiple spacings). This may be done either by inversion or by focusing. Using a forward modeling program, expected values of the transverse components of the 3DEX® data for an isotropic model are derived. A skin-effect correction is applied to the model output. Differences between the focused model output and the focused acquired data are indicative of anisotropy and this difference is used to derive an anisotropy factor. In one embodiment, a Taylor series expansion is used to approximate the 3DEX® data and use is made of the fact that the coefficient of the $\omega^{3/2}$ term is relatively insensitive to borehole and invasion effects. The present disclosure envisages a processing similar to that of Tabarovsky '562, following a Fourier transformation of TEM data acquired using multicomponent transmitters and receivers.

U.S. Pat. No. 7,392,137 to Tabarovsky et al., having the same assignee as the present disclosure and the contents of which are incorporated herein by reference, discloses an apparatus for and a method of logging an earth formation comprising a plurality of layers each having a horizontal conductivity and a vertical conductivity. An electromagnetic logging tool is conveyed into a borehole into the earth formation. The logging tool includes a plurality of transmitters and a plurality of receivers, at least one of the transmitters and at least one of the receivers being inclined to an axis of the tool by a nonzero angle. The borehole itself is inclined at a nonzero angle dip angle θ to a normal to the layers. Measurements are made with a plurality of transmitter-receiver pairs at more than one frequency. Frequency focusing is applied to the measurements. In one embodiment of the invention, using known values of the relative dip angle and azimuth, the focused measurements are separated into two or more fundamental modes. One of the fundamental modes is related primarily to the horizontal conductivity (or resistivity) of the earth formation, so that the horizontal conductivity may be obtained from the first mode. Using the determined horizontal conductivity and the second mode, the vertical conductivity may be determined. In another embodiment, the fundamental modes and the relative dip angle and azimuth are determined simultaneously using measurements made at a plurality of depths. The simultaneous determination is done by searching over a range of relative dip angles and azimuths. Alternatively, the search may be done over a range of absolute dips and azimuths and using measurements made by orientation and navigation sensors on the tool. The present method envisages using a processing similar to that of Tabarovsky '137, following a Fourier transformation on TEM data, to determine a relative dip angle between the borehole axis and the normal to an interface.

U.S. patent application Ser. No. 11/830,402 of Bespalov et al. (published as U.S. 2008/0030196), having the same assignee as the present disclosure and the contents of which are incorporated herein by reference, discloses the use of MFF to correct for eccentering of the logging tool in a borehole in an anisotropic medium and for determining formation dip and strike. U.S. Pat. No. 7,359,800 to Rabinovich et al., having the same assignee as the present disclosure and the contents of which are incorporated herein by reference, discloses an apparatus for and a method of evaluating an earth formation wherein the earth formation has a fluid filled fracture. The fluid has a resistivity that is different from that of the earth formation. Measurements are made by a first logging tool conveyed in a borehole in the earth formation. The first logging tool includes a plurality of transmitters and a plurality of receivers. Each of the plurality of transmitters and plurality of receivers has an axis parallel to an axis of the first logging tool. A plurality of transmitter-receiver spacings may be provided. A second set of resistivity measurements with a second logging tool conveyed into the borehole in the earth formation. The second logging tool is a multicomponent tool having a plurality of transmitters and a plurality of receivers, at least one of the transmitters and the receivers having an axis inclined to an axis of the second logging tool. A processor is used for processing the measurements made by the first and second logging tools to determine a length of the fracture, and/or width of the fracture. The present disclosure envisages using a processing similar to that of Bespalov '401 on TEM data (following a Fourier transformation) to account for eccentering of the BHA in the borehole. The present disclosure also envisages using a processing similar to that of Rabinovich '800 of TEM data (following a Fourier transformation) to determine the length and/or width of fracturing in the subsurface.

Figure 5:
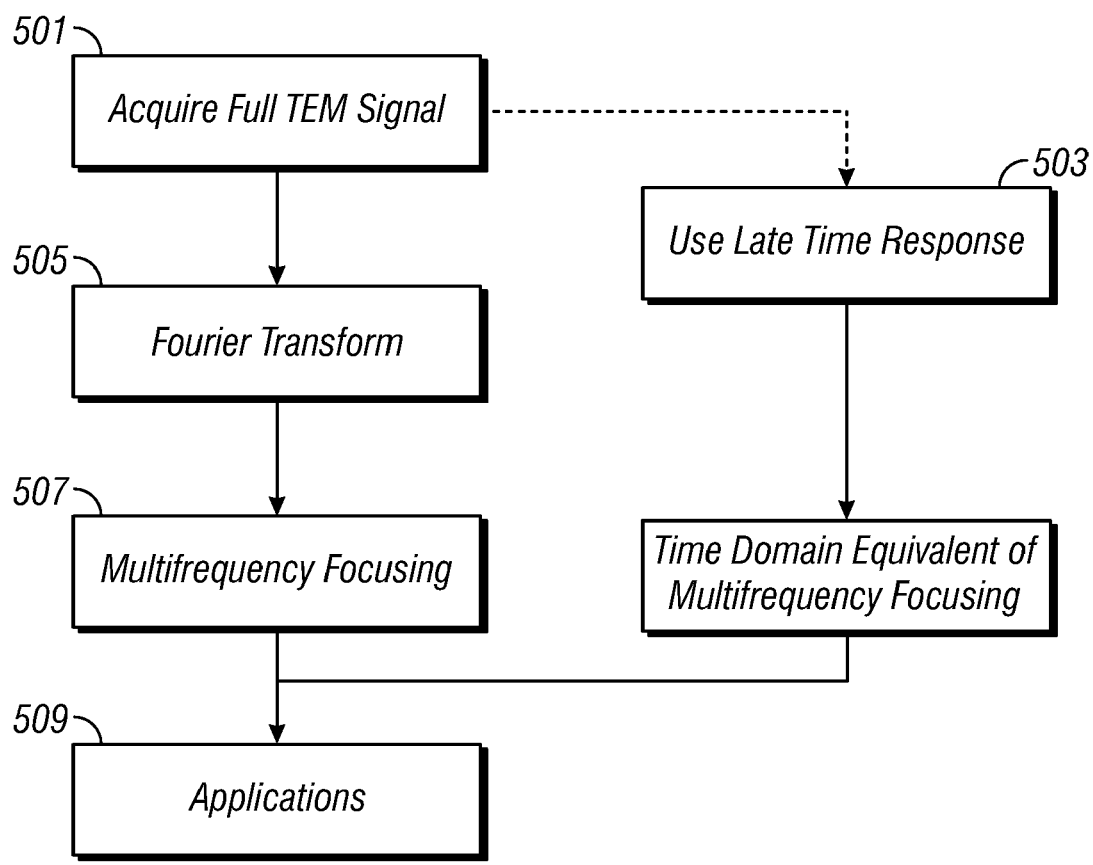
FIG. 5 shows a flow chart of some of the steps of the disclosure.

FIG. 5 gives a flow chart illustrating the method of the disclosure. At 501, a TEM signal is acquired. This can be done by either switching on a transmitter or switching off a transmitter. In one embodiment of the disclosure, the Fourier transform is applied 505. The multifrequency filtering is applied to the frequency transformed data 507. The output of the multifrequency focusing provides data for the applications discussed above. This includes determination of formation resistivity (or formation resistivities in an anisotropic medium), determination of a distance to an interface in the formation, reservoir navigation, and determination of formation dip and strike angles.

The disclosure has been described above with reference to a MWD apparatus carried on a drillstring. The method of the disclosure can also be used on other types of MWD apparatus conveyed on a drilling tubular, and may also be used on a logging tool carried on a wireline. The last such method is of relatively minor importance since on wireline devices, it is possible to have a housing of very high conductivity so that the correction methods described herein may not be necessary. Such means of conveyance would be known to those versed in the art and are not discussed further.

The processing of the data may be accomplished uphole after the data have been retrieved from the tool's memory, or may be accomplished by a downhole processor or a surface processor or a combination thereof. Implicit in the control and processing of the data is the use of a computer program implemented on a suitable machine readable medium that enables the processor to perform the control and processing. The machine readable medium may include ROMs, EPROMs, EAROMs, Flash Memories and Optical disks. The processing may occur downhole or at a surface location or at a remote location. The processing may be done substantially in real time or at a time subsequent to acquisition of the data. In an alternative embodiment, part of the processing may be done downhole with the remainder conducted at the surface location.

While the foregoing disclosure is directed to the specific embodiments of the disclosure, various modifications will be apparent to those skilled in the art. It is intended that all such variations within the scope and spirit of the appended claims be embraced by the foregoing disclosure.

What is claimed is:

1. A method of evaluating an earth formation, the method comprising:
   conveying a logging tool into a borehole;
   changing a current through a transmitter on the logging tool and inducing a current in the formation,
   receiving a transient signal resulting from the induced current in the formation;
   transforming the transient signal to a frequency domain; and
   estimating from the transformed signal a distance to an interface in the earth formation.

2. The method of claim 1 wherein estimating the distance to the interface further comprises performing a multifrequency focusing.

3. The method of claim 1 further comprising determining a direction to the interface.

4. The method of claim 1 wherein the changing of the current through the transmitter comprises one of: (i) turning off the current through said transmitter, and (ii) turning on a current through the transmitter.

5. The method of claim 1 further comprising conveying the logging tool on a bottomhole assembly (BHA) into the borehole, the method further comprising using the determined distance for controlling a drilling direction of the BHA.

6. The method of claim 1 wherein the interface is selected from the group consisting of: (i) a bed boundary, and a fluid interface.

7. The method of claim 1 further comprising determining at least one of: (i) a horizontal conductivity, (ii) a vertical conductivity, (iii) an orientation of a fracture in the earth formation, (iv) a dip angle of a bed in the earth formation, and (ii) a strike angle of a bed in the earth direction.

8. The method of claim 1 wherein the estimated distance is substantially independent of an eccentering of the logging tool in the borehole.

9. An apparatus for evaluating an earth formation comprising:
   a logging tool configured to be conveyed into a borehole; and
   at least one processor configured to:
   (i) change a current through a transmitter on the logging tool and induce a current in said earth formation,
   (ii) transform, into a frequency domain, a transient signal received by a receiver on the logging tool resulting from the induced current; and
   (ii) estimate from the transformed signal a distance to an interface in the earth formation.

10. The apparatus of claim 9 wherein the at least one processor is configured to estimate the distance to the interface by performing a multifrequency focusing.

11. The apparatus of claim 9 wherein the at least one processor is further configured to estimate a direction to the interface.

12. The apparatus of claim 9 wherein the at least one processor is configured to change the current through the transmitter by one of: (i) turning off the current through said transmitter, and (ii) turning on a current through the transmitter.

13. The apparatus of claim 9 further comprising a bottomhole assembly (BHA) configured to convey the logging tool into the borehole, and wherein the at least one processor is further configured to use the determined distance for controlling a drilling direction of said BHA.

14. The apparatus of claim 9 wherein the interface is selected from the group consisting of: (i) a bed boundary, and a fluid interface.

15. The apparatus of claim 9 wherein at least one of: (i) the transmitter, and (ii) the receiver has an axis inclined to an axis of the logging tool.

16. A non-transitory computer-readable medium product having instructions thereon that when read by a processor cause the processor to execute a method, the method comprising:
   changing a current through a transmitter on a logging tool conveyed in a borehole in an earth formation and inducing a current in the earth formation,
   transforming, to the frequency domain, a transient signal resulting from the induced current in the formation; and
   estimating, from the transformed signal, a distance to an interface in the earth formation.

17. The non-transitory computer-readable medium of claim 16 further comprising at least one of: (i) a ROM, (ii) an EPROM, (iii) an EAROM, (iv) a flash memory, and (v) an optical disk.

* * * * *